United States Patent

[11] 3,600,521

[72] Inventors Karl-Ludwig Plank 28, Berliner Strasse, Ober-Roden; Hans-Wilhelm Reher, 29, Hans Bockler Ring, Salzgitter-Lebenstedt; Johannes-Georg Schosnig, 100 Hammarskjoldring, Frankfurt am Main, all of, Germany

[21] Appl. No. 761,444

[22] Filed Sept. 23, 1968

[45] Patented Aug. 17, 1971

[32] Priority Sept. 26, 1967

[33] Germany

[31] P 15 37 904.1

[54] TELEPHONE EXCHANGE ARRANGEMENTS WITH CENTRAL CONTROL

15 Claims, 8 Drawing Figs.

[52] U.S. Cl. ........ 179/18 ER

[51] Int. Cl. ........ H04q 3/42, H04j 3/00

[50] Field of Search ........ 179/18, 18 ES, 15 AT

[56] References Cited

UNITED STATES PATENTS 3,497,630 2/1970 Lucas et al. ........ 179/18 ES 2,764,634 9/1956 Brooks et al. ........ 179/18 (reg)

*Primary Examiner*—William C. Cooper

*Attorney*—Nolte and Nolte

ABSTRACT: An automatic telephone exchange arrangement is disclosed with central control and with a central information store, individual rows in which are associated with various possible simultaneous calls, wherein each row in this information store has storage locations not only for the addresses of the calling and called subscribers but also locations for accommodating a code representing whatever program stage has been reached by the call concerned. If the telephone exchange is a private exchange, provision may be made for a subscriber to be connected to a public telephone exchange after a test has been made automatically for ascertaining whether the calling subscriber is entitled to be connected to the public exchange.

INVENTORS
Karl-Ludwig PLANK
Hans-Wilhelm REHER
Johannes Georg SCHOSSNIG
By

Nolte & Nolte
their ATTORNEYS

INVENTORS
Karl-Ludwig PLANK
Hans-Wilhelm REHER
Johannes Georg SCHOSSNIG
By
Nolte & Nolte
their ATTORNEYS INVENTORS
Karl-Ludwig PLANK
Hans-Wilhelm REHER
Johannes Georg SCHOSSNIG
By Nolte & Nolte
their ATTORNEYS

PATENTED AUG 17 1971

3,600,521

INVENTORS
Karl-Ludwig PLANK
Hans-Wilhelm REHER
Johannes Georg SCHOSSNIG
By
Nolte & Nolte
their ATTORNEYS

PATENTED AUG 17 1971

3,600,521

INVENTORS
Karl-Ludwig PLANK
Hans-Wilhelm REHER
Johannes Georg SCHOSSNIG
By
Nolte & Nolte
their ATTORNEYS

TELEPHONE EXCHANGE ARRANGEMENTS WITH CENTRAL CONTROL

BACKGROUND OF THE INVENTION

The invention relates to telephone exchange arrangements with central control. Such an exchange arrangement has already been proposed which employs a central information store, each row of which corresponds to one telephone call connection; thus the maximum number of calls in progress at any given instant equals the number of storage rows provided in the information store.

For controlling the individual stages in setting up the various simultaneous calls desired or in progress, all the rows of the central information store of the proposed exchange arrangement are read in periodic sequence. It is difficult to recognize the operational stage reached in setting up a call associated with the row of the store which is being read; however, it is essential to know precisely what stage has been reached before any further operating condition is introduced.

It is an object of the invention to facilitate recognizing the individual stages in the setting up of calls.

SUMMARY OF THE INVENTION

The invention consists in a telephone arrangement with a central control and a central information store, individual rows of which are associated with various simultaneous possible calls, wherein each row of the information store has storage locations for recording not only the addresses of the calling and called subscribers, but also a code representing whatever program stage has been reached by the call concerned. Coding the stage reached by a call at any given moment provides in a simple manner that, when a row is read, a control subprogram determined by the operating stage reached can be initiated and, when completed, the program step resulting from the new operating condition produced by that subprogram can be stored in the appropriate row of the store.

With a circuit arrangement of the invention, subprograms extending over several readings of the entire store can be carried out at every program step in the setting-up of a call without the need of providing additional means in the central program control.

BRIEF DESCRIPTION OF THE DRAWINGS

To make the invention clearly understood reference will now be made to the accompanying drawings which are given by way of example and in which.

DESCRIPTION OF THE PREFERRED EMBODIMENT

Figure 1:
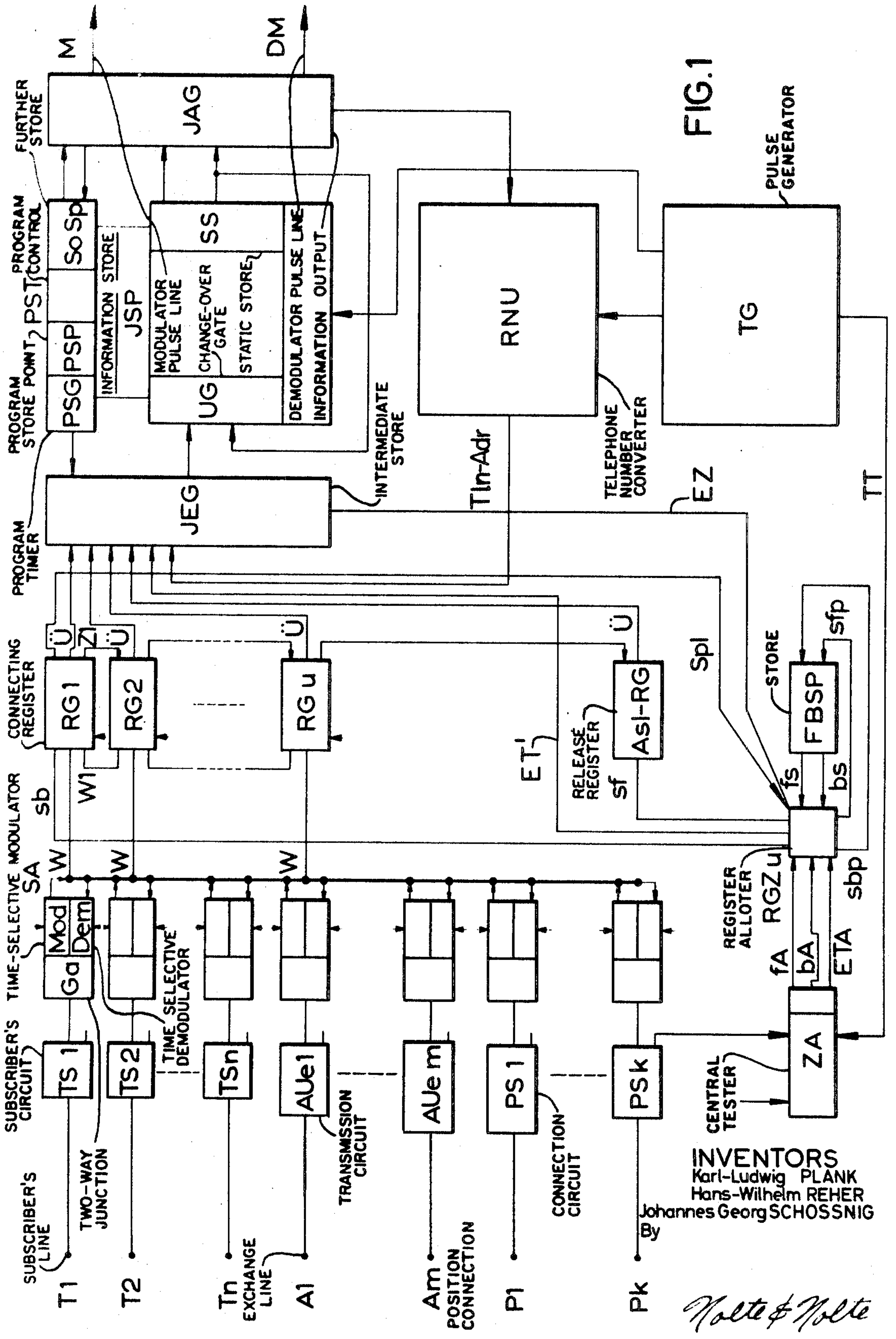
FIG. 1 is a block diagram of an arrangement of the invention.

In the block diagram of the arrangement of FIG. 1, subscribers' lines T, which each comprise two wires, are diagrammatically represented by a single line. Suffixes such as in T1, T2, T*n* indicate different subscribers, different lines, or different circuits as the case may be. Associated with each subscriber's line T is a subscriber's circuit TS. Correspondingly, associated with each exchange line A is a transmission circuit AU*e*, and associated with each position connection P is a connection circuit PS. All the connection circuits are connected to a central tester ZA. From the circuits TS, AU*e* and PS, direct current voltages are fed to the central tester ZA, the voltages corresponding to the loop conditions of the subscribers' lines T, exchange lines A and position connections P respectively. Three different loop conditions are possible, namely: *a* Loop open, indicating line free: a voltage $+U_B$ is placed on tester ZA; *b*. Loop closed, indicating line engaged: the voltage +one-half $U_B$ is placed on tester ZA; *c*. Loop earthed, indicating earth key operated: the voltage 0 is placed on tester ZA.

The speech path is switched through by time-multiplex links allotted to the individual subscribers, the links comprising a two-way function G*a*, a time-selective modulator Mod and a time-selective demodulator Dem. All the links are connected to a common bus bar SA.

Test pulses spaced apart in time are fed from a pulse generator TG over a line TT to the tester ZA. Synchronously with these test pulses, direct current voltages from the subscribers' circuits TS, transmission circuits AU*e* and position connection circuits PS are fed in rapid succession to a discriminator circuit provided in the central tester ZA. The discriminator circuit has three output lines, namely:

- $f_A$ for circuits not busy when tested, that is to say free circuits;
- $b_A$ for circuits busy when tested;
- ETA for circuits that are earth key operated at the moment when tested.

Only one of the three lines $f_A$, $b_A$, ETA can carry a voltage during a test pulse. Test signals corresponding to the conditions of the lines $f_A$, $b_A$ and ETA, after the test pulses have been converted in the central tester ZA from space to time-division multiplex, are fed to a register allotter RGZ*u*. Linked to the register allotter RGZ*u* is a store FBSP, which stores the test signals of all the subscribers and connection lines for the duration of 1 cycle of testing. When a circuit is tested the store FBSP for free and engaged signals provides, over one of the lines *fs* and *bs*, information as to the circuit condition during the preceding test cycle. If the conditions are the same for both cycles, the register allotter RGZ*u* does not emit any signal; when, however, different conditions are recorded by the central tester ZA and the store FBSP and received by the register allotter RGZ*u*, this is an indication that a change in the loop condition of the circuit being tested took place during the preceding test cycle. If a *b*A signal is received from the central tester ZA and an *fs* signal is received from the store FBSP, then the corresponding circuit has been seized. The register allotter RGZ*u* sends a signal to the line *sb*, the signal indicating that the required subscriber's line just tested is busy.

When, on the other hand, an *f*A signal arrives from the central tester ZA and a *bs* signal arrives from the store FBSP, then the corresponding circuit has become free. The register allotter RGZ*u* now sends a signal to the line *sf*, the signal indicating that the required subscriber's line is free.

As soon as one of these two signals is emitted by the register allotter RGZ*u*, the store FBSP is corrected accordingly over one of the lines *sbp* or *sfp* which are connected to the lines *sb* and *sf* respectively.

The signal on the line sb causes a free connecting register RG to be seized. A plurality of such registers RG1, RG2,...RGu are provided which can be seized successively through a chain relay circuit. A signal on the line *sf* seizes a release register A*sl*–RG. Simultaneously with these seizing actions, the subscriber's line pulse of the circuit just tested is fed through a subscriber's address line T1*n*–A*dr.z* to an intermediate store JEG in the central control, the intermediate store JEG serving for information input.

The central control comprises the units:

JEG–information input

JSP–information store
JAG–information output and
PST–program control.

The information input JEG has to coordinate with time the items of information, which arrive in accordance with statistical laws from the registers RG and the register allotter RGZ*u* and to prepare them for acceptance by the information store JSP. The information input JEG jointly with the information store JSP and the program control PST determines the location in which an address or part-address or some other characteristic is to be deposited within the information store JSP.

Figure 2:
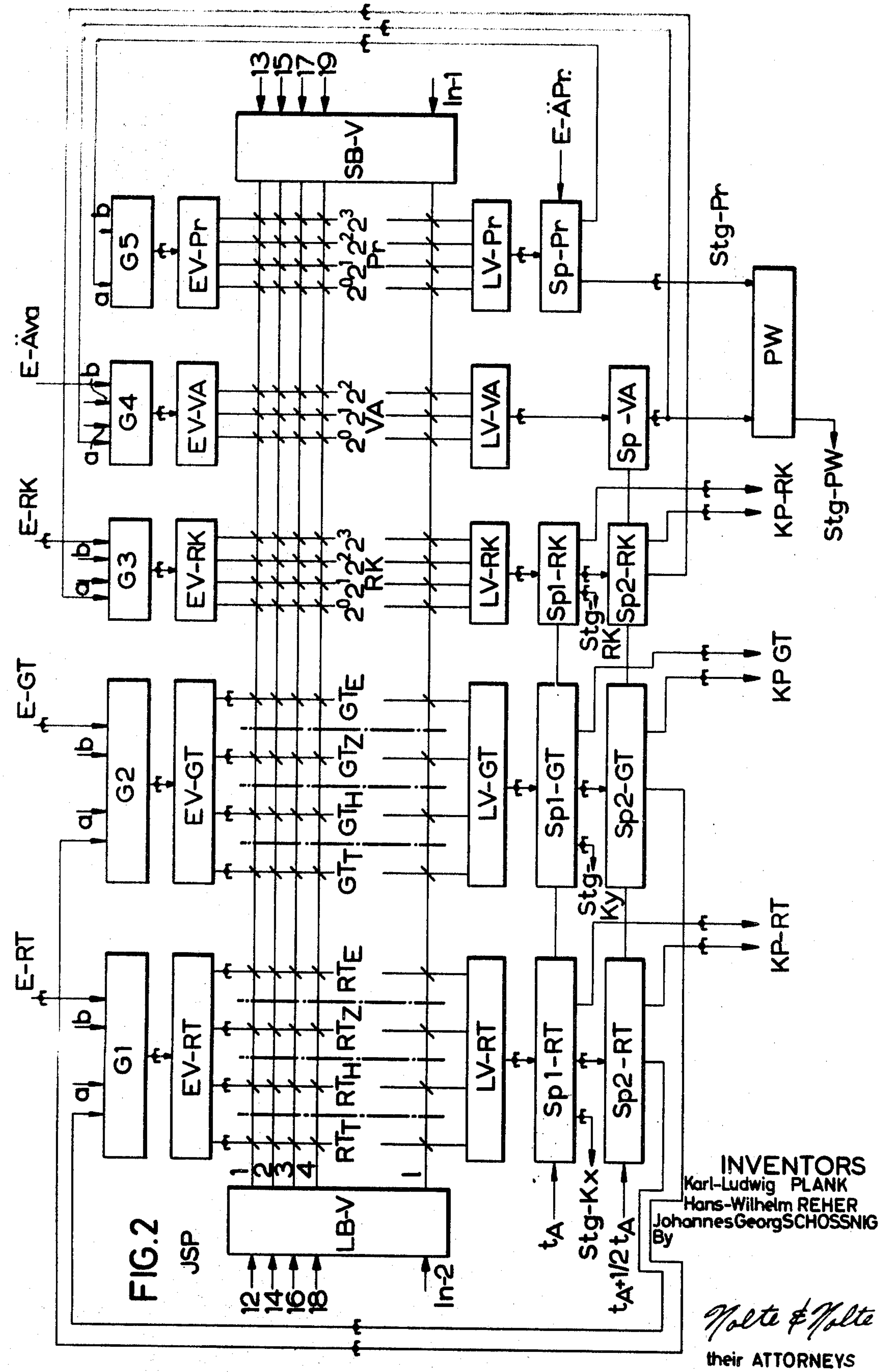
FIG. 2 illustrates the function of a central information store of the arrangement of FIG. 1.

The information store JSP illustrated in FIG. 2 comprises a ring-core matrix having a maximum of 100 rows. The number of rows in the information store JSP equals the number of calls that can be in progress simultaneously. For selecting the rows, a read command amplifier LB–V and a write command amplifier SB–V are provided. The columns in the store block are divided into five groups, namely:

RT–calling subscriber's address
RK–called subscriber's address
RK–register code
VA–grade of service and
P*r*–programming.

The number of columns in each group can be varied in accordance with the size and functions of the exchange arrangement. For example, a large automatic private exchange may require 34 to 48 columns depending on ancillary equipment. Associated with each column is a recording amplifier EV, access to which can be had coincident with access to the write command amplifier SB–V. Each column also has a read amplifier LV, which amplifies the stored information at each read command. The output of each read amplifier of the column groups RT, GT and RK is followed by two bistable multivibrators S*p*1 and S*p*2 connected as shift registers, which intermediately store statically the readout result. The column groups VA and P*r* are equipped with only a single-stage store S*p*–VA and S*p*–P*r* respectively. The storage return for all the columns is effected through gates G1 to G5 associated with the column groups. Lines S*tg*–K*x*, S*tg*–K*y* and S*tg*–RK lead from the static stores S*p*1 of the column groups RT, GT and RK to the information input JEG, the lines enabling coincidence checks in the information input JEG according to commands from a program unit PW which is connected to the information input JEG through a line S*tg*–PW. The information input JEG prepares an alteration in the storage content of the row concerned by blocking the groups of storage return gates G1 to G5. The E–RT, modified items of information can be fed into the row from the information input JEG through feed-in lines E–RT, E–GT, E–RK, E–AV*a* and E–A*pr*. In addition, signals derived from both the static store groups S*p*1 and S*p*2 are fed over lines KP–RT, KP–GT and KP–RK to the information output JAG. The duration of a storage cycle of the information store JSP is 100 $\mu s$.

The program control PST (FIG. 1) constitutes a logic network which, based on coincidence checks between the store rows and the information input JEG on the one hand and based on program points linked to the stage reached by a call associated with a row, coordinates the correct feed-in of intelligence temporarily stored in the information input JEG. The information output JAG prepares the connecting through of the speech path according to the intelligence contained in a row of the store.

The occurrence of a pulse in the line *sb* indicates that the loop condition just tested has changed from free to busy. This is the case either when the subscriber whose line has just been tested is trying to set up a call to another subscriber, or when a called subscriber has lifted his receiver. Since, when a pulse in the line *sb* occurs, no decision about this has yet been arrived at, the position in time of the pulse in the line *sb* is reported to the information input JEG over a subscriber's-address line T1*n*–A*R*)*Z*) The subscriber's address in binary code is immediately passed by the pulse generator TG to the information input JEG by way of a telephone number converter RNU (FIG. 1) and a multiconductor line T1*n*–A*dr*. Through the line T1*n*–A*dr*, the addresses of all the subscribers are then impressed in time sequence on the information input JEG when the subscriber's line condition is tested through the central tester ZA.

Meanwhile, by means of the pulse in the line *sb* and, possibly, the lines W1, a free register has been located and seized among the registers RG1 to RG*u*. Each register has its own code number. The register code of the register just seized is passed over a multiconductor line U to the information input JEG for temporary storage.

Thus, when a pulse occurs in the line *sb*, the following items of information are stored temporarily in the information input JEG:

a. the address RT of the calling subscriber's line from which the pulse in the line *sb* is derived;
b. the register identification, that is to say the register code RK of that register which has been made available to the calling subscriber for dialling signals.

If required, the grade of service of the calling subscriber RT can be additionally stored temporarily in the information input JEG.

Capacity is also provided in the information input JEG for the temporary storage of the following items of information:

the address of the called subscriber's line GT, or individual digits thereof;

grade-of-service codes, i.e. coded information to the effect that a particular kind of call is required for example a call to the public exchange or to an operating or inquiry position.

After feeding in the information relating to the RT address and the register code RK, the information input JEG blocks the register allotter RGZ*u* by a signal over the line S*p*L, so that no further pulse can be passed over one of the lines *sb* or *sf* for the line just tested. During the next following storage cycle after the blocking of the information input, a test is made whether the register code RK is already stored in any row of the information store JSP. This test is bound to be answered in the negative, since the register, as has been assumed, was free at its seizure. During a second storage cycle, it is tested whether the calling subscriber's address is already stored in any row of the information store JSP. This cannot be so, if the impulse in the line *sb* was derived from the line of a subscriber who wishes to set up a connection for a call.

If during the first two storage cycles, neither coincidence was found between the register code RK stored in the information program JEG and any row in the information store JSP in one of the columns reserved for the RK address, that is to say a so-called RK-coincidence, nor coincidence was found between the calling subscriber's address temporarily stored in the information input and any row 100 the information store JSP in one of the columns reserved for the calling or called subscriber's address, that is to say a so-called RT-or GT-coincidence, the busy condition is a new one, as always applies when a subscriber is trying to set up a new call.

At the beginning of the third storage cycle, the program control PST acts on the information "RK-coincidence in first cycle negative" and "RT -and GT-coincidence in second cycle negative," and sends the command "search for free row in information store JSP." In the information store JSP, in addition to the columns allocated to the various addresses RK, RT and GT, further columns for storing a program point and for storing additional codes are provided. In the program-point columns coded information is stored which characterizes the operational condition of the storage row at any time and of the connection based thereon. The special-code column enables time supervision of various kinds, the preparation of a first call and so forth.

On the command "search for free row," the program control PST checks the rows of the information store JSP successively during the third storage cycle to ascertain at which program point they are. The complete information temporarily stored in the information input JEG is transferred to the first row in whose program-point columns the information "zero"

is found. The following items of information are thus received by this free row of the information store JSP:

a. address RT of the calling subscriber;

b. register code RK;

c. possibly the grade-of-service code of the calling subscriber.

Simultaneously, the information "one" in binary code is stored by the program control PST in the program-point columns. Thereby, the row cannot be seized again.

In the subsequent forth storage cycle, the correct transfer of the items of information from the information input JEG is checked by means of coincidence checks in the columns corresponding to (a), (b), and possibly (c), and subsequently the information input JEG is cleared. When the information input JEG has been cleared, fresh items of information from any registers can be fed to the information input JEG, since the blocking of the register allotter RGZ*u* through the line S*p*1 has been cancelled.

After the information has been transferred from the information input JEG and stored in a row of the information store JSP, the information output JAG can set up particular connections in accordance with this information. During each storage cycle of a duration of 100$\mu$s, all the rows of the information store JSP are successively read out to the static store SS and restored. This process takes 1 microsecond for each row of the store. With program point 1 (PP1), the "invitation to dial" signal is impressed for a period of about 0.25 microsecond by a calling and signalling machine through the bus bar SA on the demodulator of the calling subscriber's line characterized by the RT address. In addition, at a spacing of approximately 0.25 microsecond, the modulator of the calling subscriber RT is connected for about 0.25 microsecond to the demodulator of the register identified by the RK address, so that the register can accept dialling signals from the bus bar SA across the line W.

For carrying out the various processes of a so called microprogram associated with the same program step, the program control PST is associated with a program timer PSG comprising essentially a so-called "zero timing counter" able to count the individual cycles of operation of the information store JSP. Also connected to the program control PST is a program point store PSP, which contains at any moment the ordinal number of the program point stored in code in the program-point field of the information store row just tested.

The operational relationships will now be explained with reference to FIG. 3. The program timer PSG is normally at rest. As soon as a register code address is fed into a store RK–A of the information input JEG and OR-circuit V1 recognizes that the content of the store RK–A differs from zero. This causes the program timer to start.

Figure 3:
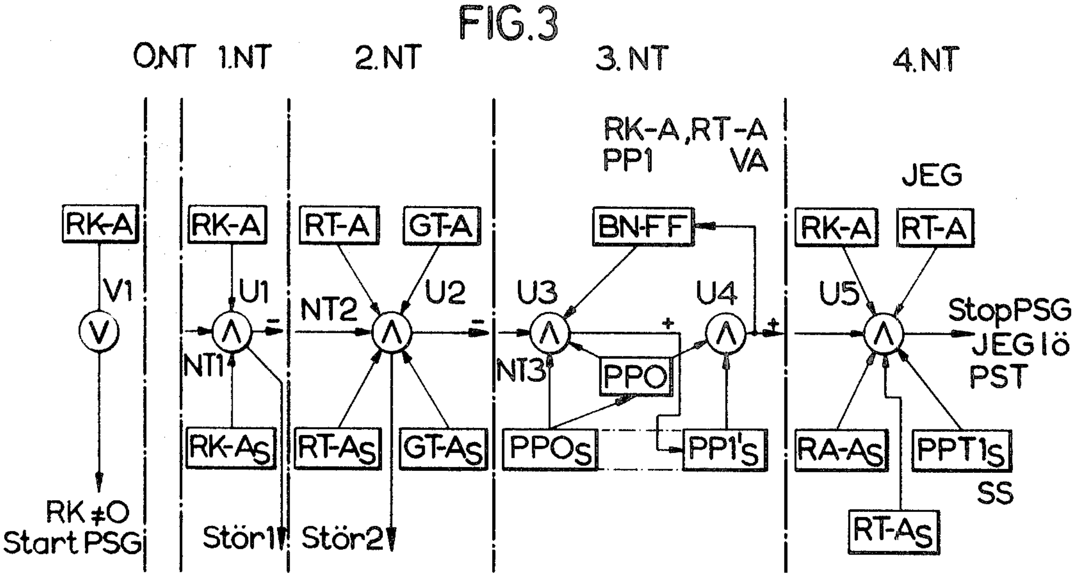
FIG. 3 is a block diagram of the central control of the arrangement of FIGS. 1 and 2 at the moment at which a free row in the store is seized for setting up a call.

In FIG. 3, the individual store locations RK–A, RT–A, GT–A of the information input are indicated in the uppermost line. In the lowermost line, the individual store locations RK–$A_S$, RT–$A_S$, GT–$A_S$ and $PP_S$ of the static store SS are indicated, which hold the content of the row being read of the information store JSP. In intermediate positions, the contents of the program point store of the program control PST are indicated.

The starting of the program timer PSG has the result that at the beginning of the next cycle of operation the information store JSP the zero timing counter in the program timer PSG is set to zero timing O.NT. No test is carried out during the zero timing O.NT. At the beginning of the second cycle of operation, the zero timing counter is set to the first zero timing 1.NT; this causes, through a line NT1, the activation of an AND-circuit U1, in which the content of storage location RK–A of the information input JEG is compared with the content of storage location RK–$A_S$ of the static store SS. This RK coincidence test has to have a negative result, if a free register has been newly seized owing to an *sb*-pulse. If, however, the RK-coincidence test is positive, a signal is transmitted to a line Stor 1, over which a fault-tracing program can be started.

When the RK-coincidence test has a negative result, then the zero timing counter is set to the second zero timing 2.NT at the beginning of the next cycle of operation of the information store JSP. Through line NT2, AND-gate U2 is activated, through which the store location RT–A of the information input JEG is compared with the store location RT–$A_S$ of the static store SS and the content of store location GT–A of the information input JEG is compared with the content of store location GT–$A_S$ of the static store SS. This RT- and GT-coincidence test in the second zero timing has also to be negative when as assumed new seizing took place. Should the test result be positive, a signal is fed to line Stor 2 over which a fault program can be started.

With a negative result of the RT- and GT-coincidence test, the third zero timing 3.NT is set up by the zero timing counter at the beginning of the fourth cycle of operation. Through line NT3, AND-circuit U3 is activated, by which the code combination of the program point PPO, which is in the store PSP of the program control PST, is compared with the content of the store location PPS of the static store SS. When coincidence is found, a seizable store row is found. With a positive signal emitted by AND-circuit U3 when coincidence occurs, a change is prepared in the storage content of the program-point location of the row of the information store, and thereby an AND-circuit U4 is activated. This AND-circuit U4 compares the prepared storage of the next program point PP1'S with the previous program point PPO and, in the event of agreement, feeds a signal to the program control PST to place the new program point PP1 into its store PSP.

The positive coincidence signal from the AND-circuit U4 has also caused the contents of the store locations RK–A and RT–A and possibly of a store location for grade of service in the information input JEG to be taken over through changeover gate UG (FIG. 1) by corresponding store locations in the row of the information store JSP. Moreover, gate U3 is blocked by the operation of engaged -new- flip-flop BN-FF, so that no further free row can be seized as a result of this process.

At the beginning of the next cycle of operation of the information store JSP, the zero timing counter sets up the fourth zero timing 4.NT, in which through line NT4, an AND-circuit U5 is activated. In the AND-circuit U5, the content of the store location RK–A of the information input JEG is compared with the content of the store location RT–$A_S$ of the static store SS, and the content of the program-point store PSP of the program control is compared with the program-point store location in the static store SS. If in all three cases coincidence occurs, the writein has been effected correctly and a positive signal from the AND-circuit U5 stops the program timer and causes the information input JEG and the program control PST to be cleared. The "row search" program for the calling subscriber is now completed.

When the calling subscriber's address and the register code of the register allotted to him have been stored and program point 1 has been put into a row of the information store JSP, the calling subscriber hears a dialling tone. The modulator permanently allocated to his line and the demodulator inserted before the register (FIG. 1) are energized synchronously for 0.25 microsecond every 100 microseconds by two pulses occurring simultaneously at the output of the information output JAG, so that dialling signals sent out by the subscriber reach the dialling-signal receiver of the register. The dialling signals are added and stored in the register. When the dialling signal receiver of the register recognizes the end of a digit from a longer interval that follows a pulse train, it asks the information input JEG through the line U for permission to transmit. As soon as the information input JEG is free, the register is informed accordingly through line E–Z and the first register in which a completed digit has been recognized by its dialling signal receiver passes that digit together with its own register code through its line U to the information input JEG. The register code is again put into the column RK–A provided for register codes in the information input JEG, and the dialled digit stored in the register is written into each position of the calledrsubscriber's address column GT–A of the information input JEG.

The construction of the register is simplified by feeding the multidigit telephone number of the called subscriber digit by digit, as each digit is dialled. The storage capacity of the register corresponds to only a single decadic digit. The own logic equipment of the register can be kept small. All the equipment for recognizing the end of dialling, for applying audible signals, for testing whether the subscriber was in fact entitled to dial the number actually dialled, and for other purposes, such as for information as to the particular access line to which the register is connected in each instance, may be omitted from the register itself and instead provided in the program control common to all the registers.

Figure 4:
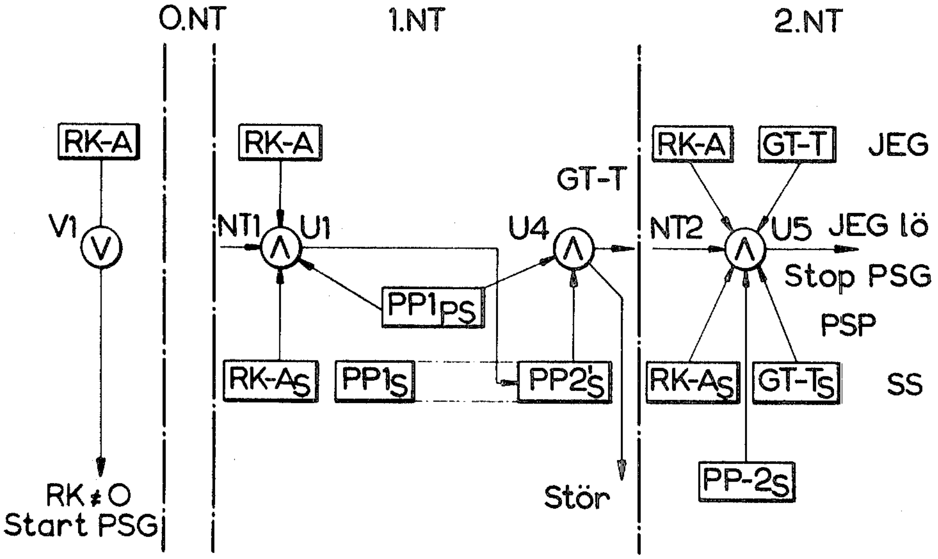
FIG. 4 is a block diagram of the central control at the moment of storing the thousands digit of a called subscriber.

Upon a dialled digit and register code being accepted in the intermediate store of the information input JEG, the register allotter RGZ*u* is blocked again through line S*p*1. Furthermore, line EZ prevents further information form being transmitted by another register. During the first storage cycle following the blocking of the information input, the rows of the information store JSP are again tested for RK coincidence. The further operation may be recognized from the block diagram of FIG. 4.

A change in the content of store location RK–A of the information input JEG results in a signal in the line Start PSG. At the beginning, the zero timing counter is first reset at the first cycle of operation of the information store JSP. At the next cycle of operation, the zero timing counter is set to the first zero timing 1.NT. During this zero timing, a signal is applied to line NT1 by which AND-gate U1 is activated. The AND-gate U1 compares the address in the store location RK–A of the information input JEG with the addresses in the store location RK–$A_S$ of the static store SS. As soon as coincidence is found, taking into account that the store PSP is set to program point PP1, that row of the store is ascertained which was seized by the register during the program step 0. The positive coincidence signal sent out by the AND-circuit U1 causes the program timer to be advanced from program point PP1 to program point PP2. As soon as the preparatory program point PP2' has been set up in the static store SS, this preparation is compared in AND-circuit U4 with the program point PP1 temporarily stored in the store SPS of the program control. If preparation of the new program point is in order, AND-circuit U4 transmits a signal to the program control PST for setting the program point PP2 and another signal for taking over the dialled digit stored in address column GTA of the information input JEG by the appropriate address column of the information store JSP. From the program point of the row in the information store JSP, found upon register coincidence, the program control ascertains the position within the called subscriber's address column into which the dialled digit is to be written. If, for example, with a multidigit address system, the position is ascertained from the program point PP1 of the row concerned, the digit held in the information input JEG is written into the store location GT–$T_S$ of the static store SS as the thousands digit, and the code PP2 is then placed into the program-point column. During the next cycle of the information store, a voltage is applied to line NT2 whereby the AND-gate U5 is activated. Thereby the correct storing is checked by coincidence test between information input JEG and static store SS of information store JSP. If the coincidence test has a positive result, the AND-gate U5 emits a signal JEG1*o* for clearing the information input JEG and the dialling-signal receiver of the transmitting register, whereby the blocking of the register allotter RGZ*u* is removed again.

Upon setting of program point PP2, the dialling tone is no longer applied to the bus bar SA in time with this row and pulsed access to the calling subscriber's demodulator is no longer given by the information output JAG, so that the calling subscriber ceases to receive a dialling tone. Subsequent digits dialled by him are stored, as already described in the appropriate positions of the GT address of the called subscriber, the program point code being advanced by 1 at each digit. In the case of a four-digit numbering system, and on storing the final dialled digit into the information store JSP, program point PP5 is set up in the program point column of the corresponding row. After testing for correct storing, however, and when program point 5 has been reached, the information input JEG and the dialling-signal receiver of the transmitting register are not cleared. The information input JEG remains engaged. The signal emitted by AND-circuit U6 (FIG. 5) tests the correct storing by coincidence between the content of store location RK–A of the information input JEG and the content of store location RK–$A_S$ of the static store SS of the information store JSP, between the content of store location GT–E of the information input JEG and the content of the store location GT–$E_S$ of the static store SS, and between that of store location PP5 of the program control and that of store location $PP5_S$, and energizes a control mechanism GT–S*tg*, which clears the store columns GT–A and RT–A in the information input JEG, blocks the restoring of the store location GT–$A_S$ from the static store SS to the core-store row in the information store and transfers the content of the store location GT–$A_S$ of the static store SS from the information output JAG to a further store S*o*S*p* of the program control PST (FIG. 1). Thereby the complete address of the called subscriber in the information store JSP and in the information input JEG is cleared during the second zero timing 2.NT; this called subscriber's address is now held only in the further store S*o*S*p*.

During the third zero timing 3.NT, the free-engaged test (FIG. 5) is performed by checking, during one complete cycle of the information store JSP, whether the address placed into the further store S*o*S*p* agrees with an address in the store locations RT–$A_S$ or GT–$_S$ of the information store which receive the address of a calling or of a called subscriber. For this purpose, the further store control S*o*S*p*S*tg*, acting through an AND-circuit U7 activated by a signal over the line NT3, activates another AND-circuit U8, through which the content of the further store S*o*S*p*, namely the address of the called subscriber, is placed into the store locations RT–A and GT–A of the information input JEG at the beginning of the third zero timing. During the cycle of the information store JSP in the third zero timing NT3, all the rows of the information store JSP are compared through store locations GT–$A_S$ and RT–$A_S$ of the static store SS with the contents of the store locations RT–A and GT–A of the information input by means of AND-circuit U9. A free-engaged flip-flop *b-f*-FF connected to the output of AND-circuit U9 is tripped to the free condition at the beginning of the third zero timing; in the case of coincidence between the contents of the store locations RT–A and RT–$A_S$ or GT–A and GT–$A_S$, the flip-flop *b-f*-FF is tripped to the engaged condition. Such coincidence is an indication that the called subscriber's line is engaged, either because he is setting up an outgoing call or because he has been called over another connection. In that case, an engaged program is initiated during the fifth zero timing, and on completion of the engaged program the busy tone is transmitted to the calling subscriber.

If, however, no coincidence is found during the third zero timing, the flip-flop *b-f*-FF remains in the free condition. This condition continues to be stored beyond the fourth zero timing. During the fifth zero timing which follows the fourth zero timing, a search is again made by means of the register address still temporarily stored in the store location RK–A of the information input JEG for that row of the information store JSP from which the address of the called subscriber was transferred to the further store S*o*S*p* during the second zero timing. As soon as AND-circuit U10 finds coincidence between the contents of the store locations RK–A of the information input JEG and the store location RK–$A_S$ of the static store SS, stepping to program point 6 is caused in the manner described above. If this stepping has been correctly prepared, AND-circuit U11 transmits a control signal causing the complete address of the called subscriber to be transferred from the store location GT–A of the information input JEG to the store location GT–$A_S$ of the information store JSP.

During the sixth zero timing 6.NT, a check for correct storage is made by testing for coincidence of the contents of the store locations GT–A of the information input JEG and GT–$A_S$ of the information store JSP by means of AND-circuit U12. The clearing signal given by the AND-circuit U12 in the event of positive coincidence causes the information input JEG to be cleared, the register RG to be released so that it may be seized again, the store location RK–$A_S$ of the information store JSP to be cleared and the program timer PSG of the program control PST to be stopped so that the latter is restored to its position of rest.

The placing of the program point PP6 into a storage row of the information store JSP marks the calling condition, it having been confirmed that a complete subscriber's address has been dialled and that the subscriber's station corresponding to that address is free; there is now nothing to prevent the ringing current from being connected to the called subscriber's line and the ringing tone indicating subscriber free from being connected to the calling subscriber's line. These connections are effected in a manner analogous to those of the dialling tone.

When the called subscriber hears the ring and lifts his receiver, then this change in condition on his line is recognized by the register allotter RGZ*u* upon testing by the central tester ZA (FIG. 1).

As already described in connection with the lifting of the calling subscriber's receiver, the address of the engaged register is stored in the store location RK–A of the information input JEG and the address of the called subscriber in the store locations RT–A and GT–A of the information input JEG. The appearance of information in the store location RK–A of the information input JEG caused the program timer (FIG. 6) to start. During the subsequent cycles of operation of the information store JSP, a test is now made as to whether the address of the called subscriber already appears in a row in the information store. He being the called subscriber, such is indeed the case. During the third cycle of operation 2.NT, AND-gate U13 activated through line NT2 finds coincidence between the content of the store location GT–A of the information input and the content of the store location GT–$A_S$ of the row of the information store JSP tested through the static store SS. This row comes in program step PP6. The signal emitted by AND-gate U13 on coincidence being found causes stepping on and storing of program step PP7.

In accordance with program step PP7, the modulators and demodulators of the calling and called subscribers are alternately activated through the information output so that both subscribers are enabled to speak to each other.

When one of the subscribers hangs up, the voltage change is noted by the condition tester ZA, which passes a signal through line *f*A to the register allotter RGZ*u* (FIG. 1). At the moment of this test, line *bs* from the free-engaged store FBSP carries a signal corresponding to the condition found during the previous cycle of the tester ZA. Owing to coincidence between the signals in lines *f*A and *bs*, the register allotter RGZ*u* feeds a signal to line *sf*, by which the release register A*s*1–RG is seized. Simultaneously, the store condition in the store FBSP is changed.

Release register A*s*1–RG transfers its address to the store location RK–A of the information input JEG. At the same time, the address of the subscriber who has hung up is stored in the store locations RT–A and GT–A in the information input JEG.

Figures 6, 7:
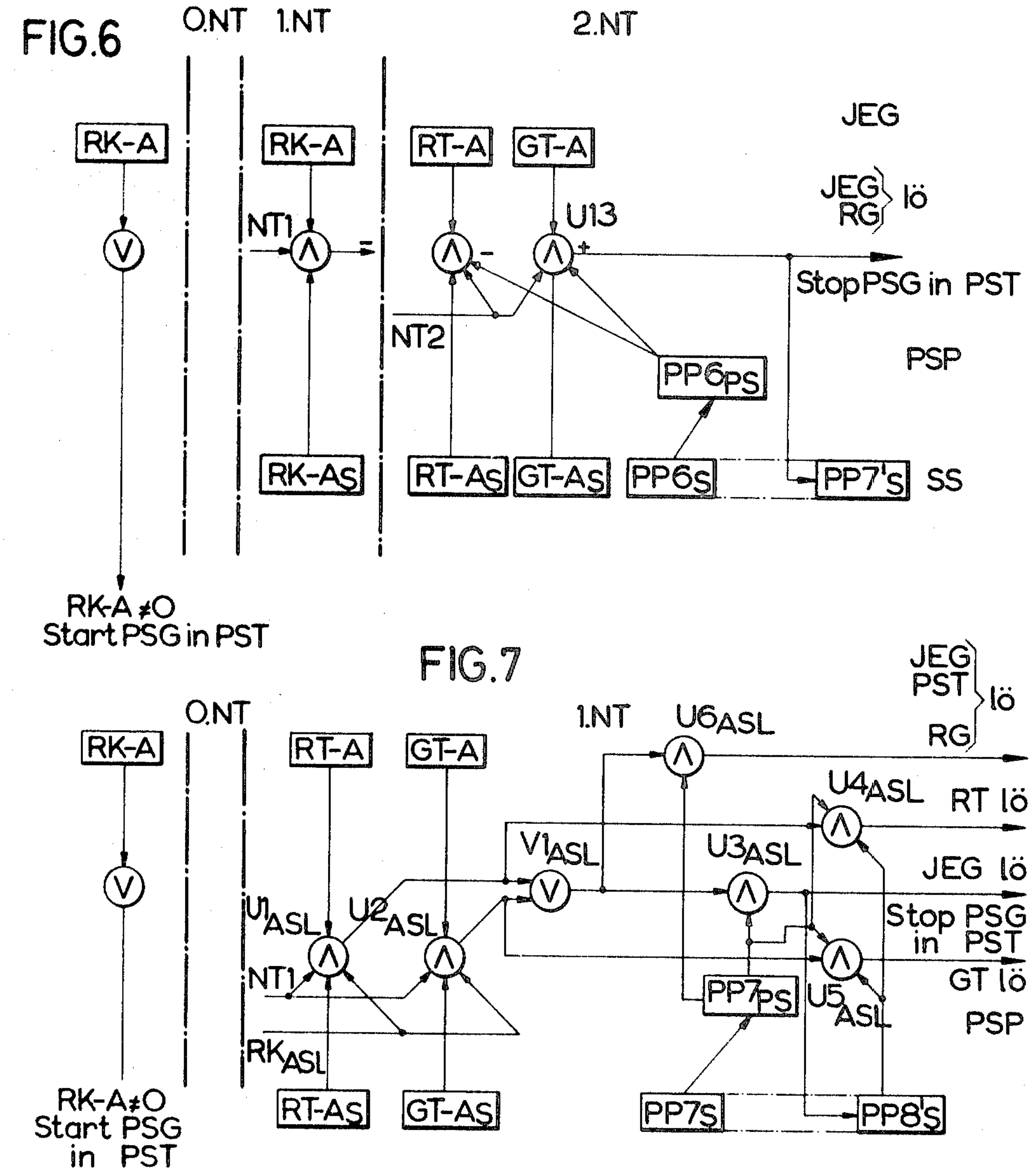
FIG. 6 is a block diagram of the central control at the moment the called subscriber lifts his receiver.
FIG. 7 is a block diagram of the central control at the moment a subscriber replaces his receiver at the end of a call.

Upon the register address of the release register being placed into the store location RK–A of the information input JEG, program timer PSG is again started (FIG. 7). During the first cycle of operation 0.NT, no test is made on this process. During the first zero timing 1.NT, a test is made by AND-gate $U1_{AS1}$ for coincidence of the information located in store location RT–A of the information input and by AND-gate $U1_{AS1}$ for coincidence of the information located in store location GT–A of the information input JEG with the information in the corresponding store location RT–$A_S$ and GT–$A_S$ in the row of information store JSP just tested through the static store SS. When RT- or GT-coincidence has been found, a decision has to be made as to whether the first or the second subscriber taking part in the call has hung up. If the first subscriber has replaced his receiver, an engaged program has to be initiated. If the second subscriber has hung up, the connection has to be cleared and the row of the information store has to be released.

The RT- or GT-coincidence ascertained is passed through an OR-circuit AS1 AS1to two AND-circuits $U3_{AS1}$ and $U6_{AS1}$.

If the first subscriber has hung up, the row in which coincidence was found is still in program step PP7. Through $PP7_{PS}$, AND-circuit $U3_{AS1}$ is activated and the program step $PPS'_S$ is consequently prepared. According to whether the calling or the called subscriber has replaced the receiver, the respective address is cleared through one of two AND-circuits $U4_{AS1}$ and $U5_{AS1}$, which are activated by program step $PP7_{PS}$, by a signal sent to line RT1*o* or GT1*o*. The output from AND-circuit $U3_{AS1}$, moreover, clears the information input JEG and stops the program timer PSG, so that the program control PST also comes to rest. At the end of this engaged program, the store row contains:

the address of the subscriber who has not yet hung up, and
the code of program step PP8.

When, however, the last subscriber taking part in the call replaces his receiver, the information $PPx_{PS}$, *x* equaling 7, is in the program point store. This information activates AND-circuit $U6_{AS1}$ and completely clears the row as well as the information input JEG, program control PST and, if necessary, the register RG.

When program step PP8 is set up, a busy tone has to be sent to the remaining subscriber. This is done by activating the modulator of a busy-tone supply source and of the demodulator of the subscriber concerned.

Figure 5:
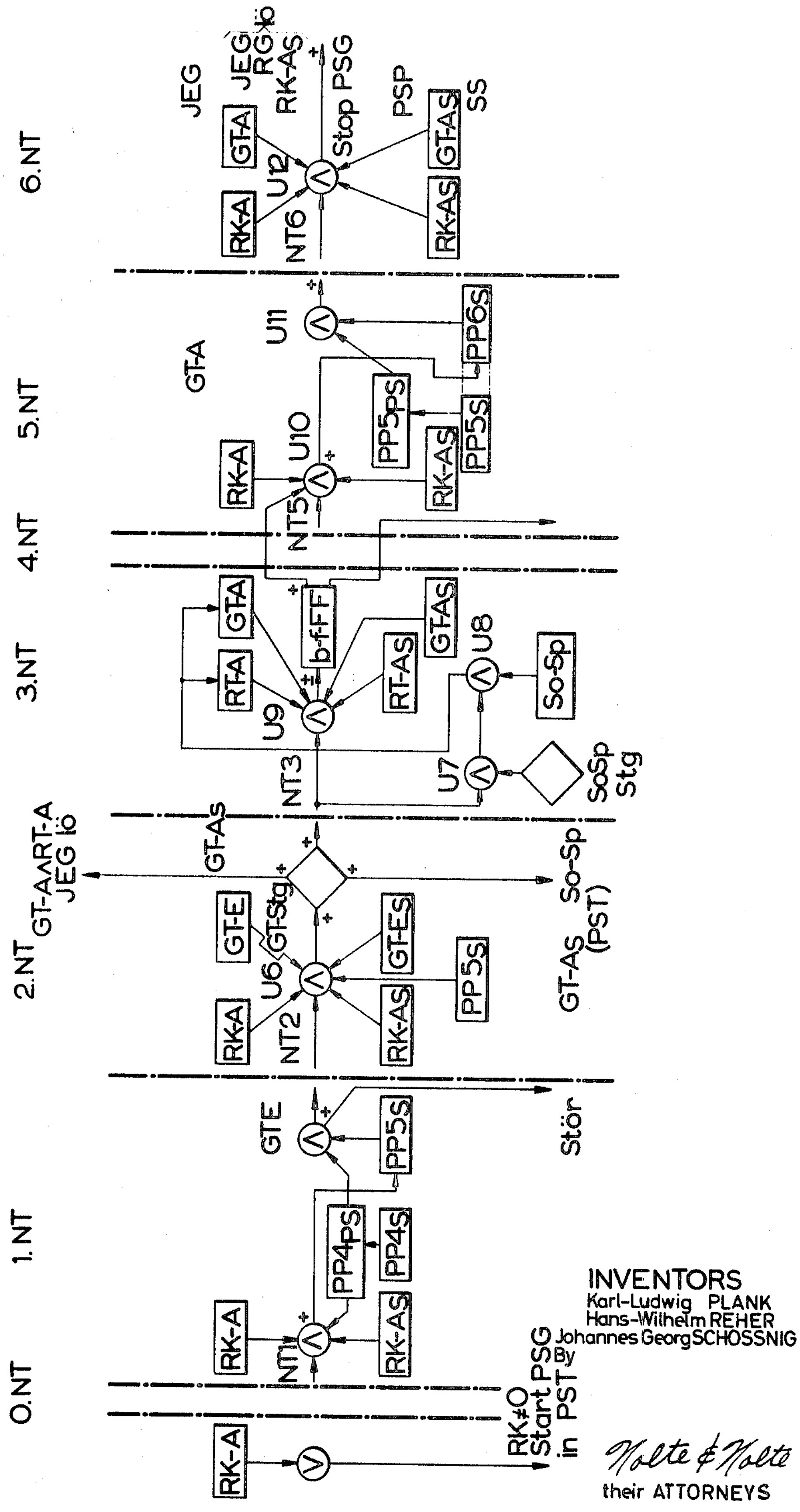
FIG. 5 is a block diagram of the central control at the moment of testing whether the called subscriber's line is free or engaged.
Figure 8:
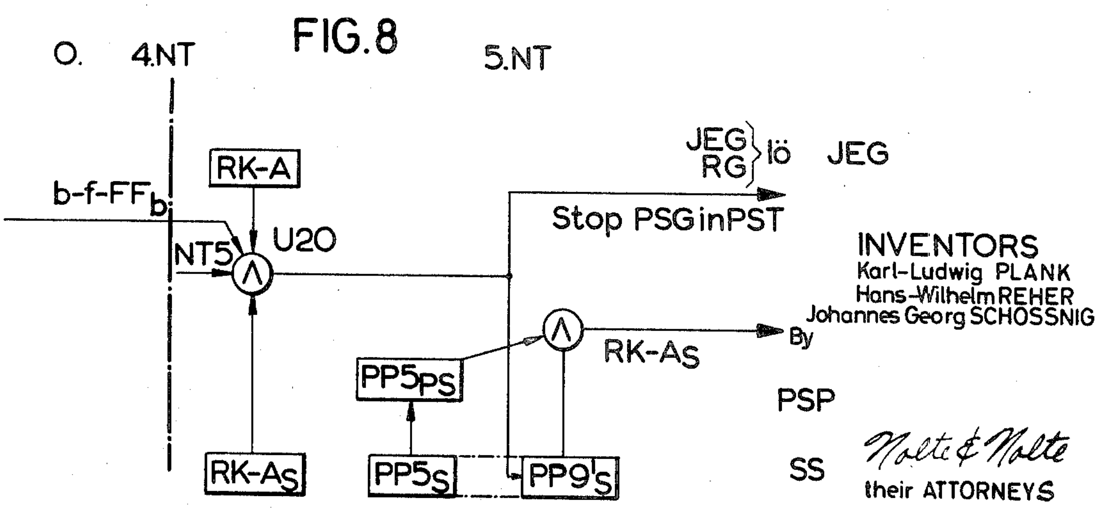
FIG. 8 is a block diagram of the central control at the moment of testing whether the called subscriber's line is free or engaged when the called subscriber's line is in fact engaged.

If it is found from the free-engaged test, after the called subscriber's s has been dialled, that this address coincides with the address in the store location RT–$A_S$ or the address in the store location GT–$A_S$ of a row of the information store JSP, then flip-flop S b-f-FF is tripped into the engaged condition (FIG. 8) through AND-circuit U9 (see also FIG. 5). Then during the zero timing 5.NT, a search is made for that row in which the content of the store location RK–A of the information input JEG coincides with the content of the store location RK–$A_S$ of a row of the information store. This row is changed over from program point PP5 to program point PP9, and the address of the called subscriber is not stored. Simultaneously the information input JEG, the register RG, the content of the store location RK–$A_S$and the program control PST are cleared and stopped.

At program point PP9 an engaged signal has to be sent to the calling subscriber. This is effected by activating the modulator of the busy-tone supply source and the demodulator of the calling subscriber.

In setting up a call from a private extension to the public system (outgoing exchange call), the program sequence up to the changeover from program step 1 to program step 2 is completely identical with that hereinbefore described. The first digit to be dialled by the subscriber is the traffic separation code (for example the digit 0 for public exchange calls). Let it be assumed that register RG3 has been allotted to the calling subscriber (for example, subscriber number 1386) and that the storage row 14 has been seized. Before dialling begins, in row 14 has been stored:

| RT | RK | GT | VA | P*r* |
|---|---|---|---|---|
| 1386 | 003 | 0000 | 00 | 1 |

The dialled digit 0 now enters the register RG3. Upon recognizing the space interval, the register RG3 obtains access to the information input JEG through line U and transfers the digit 0. In the feed-in row of the information input JEG thus has been stored:

| RT | RK | GT |
|---|---|---|
| 0000 | 003 | 0000 |

The information input JEG causes the information store JSP to be connected and now searches for that row in the store which has been seized by the register RG3. When row 14 has been found, the following information is stored therein:

RT RK GT VA *Pr*
1386 003 0000 01 2

Now the content of the column group RT is fed into the further store *SoSp* into which at program step 5 for purely internal traffic the address of the called subscriber was placed for free testing. As soon as during the next test cycle the RT address coincides with the test stage for the calling subscriber, it is tested whether the calling subscriber is entitled to make public exchange calls. Let it be assumed that the entitlement to public exchange calls is signalled by telephone number store RNU through the information input JEG to the information store JSP. If the subscriber No. 1386 not entitled to make public exchange calls, program step 8 is set up in row 14 and the busy tone is sent to the subscriber. The register is released. If, however, the subscriber is fully entitled to make public exchange calls, a free public exchange transmission circuit is allotted to him. Through a common connecting equipment in the central control, on e of the exchange transmission circuits AU*el*.... AU*em* (see also FIG. 1) is selected and seized. The address is this circuit is placed into the GT column of the information store JSP. Assuming this address to be, for example, 0543, this information contained in row 14 of the store is:

RT RK GT VA *Pr*
1386 003 0543 01 7

Subscriber 1386 now receives a dialling tone from the public exchange and can continue dialling. Since the code of the register RG3 is still stored, that register controls the further dialling process. When the subscriber dials the next digit, this digit reaches both the public exchange through the exchange transmission circuit, and the register. Should this be a blocked digit (for example 0 or 9 as the digit for trunk dialling, or 1 for announcement services), the entitlement of the calling subscriber is again tested by the central control and it is decided whether the further setting up of the call is to be permitted. With grade of service VA 01, the calling subscriber an only make ordinary local calls.

A subscriber's telephone number within the local system can begin only with the digits 2 to 7, and therefore on receiving such a digit and as soon as the space interval is recognized, the register is released the register code is cleared in the central control and store.

It is assumed in the example however that the subscriber 1386 wishes to set up a subscriber-dialled trunk call. Therefore, when an exchange transmission circuit has been allotted, he dials 0 again. Thereby the register RG3 again obtains access to the information store JEG which effects the connection to the information store JSP; the information held in row 14, after testing the entitlement, is changed as follows:

RT RK GT VA *Pr*
1386 003 0543 02 7

At the VA 02 stage, a fee meter or an outlet to a metering center is connected by the central control to the public exchange transmission circuit. The register RG3 still remains in circuit for supervising the progress of the call, since it has not yet been determined whether the subscriber is staying within the national system. Assume that the next digit dialled is 6. Upon the register RG3, information input JEG and information store JSP being connected together, the register RG3 is released and the register code in row 14 cleared. The subscriber can now freely dial into the public system until the call has been set up. The information store JSP contains the following information:

RT RK GT VA'*Pr*
1386 000 0543 02 7

When on completion of the call the subscriber 1386 replaces his receiver, the connection is completely cleared through release register ASL–RG, contrary to what occurs in purely internal traffic. The connection to the public exchange is cut.

If it it necessary to put through an inquiry while the public exchange call is in progress, the subscriber 1386 operates an earth key. Through the condition tester ZA, during the test associated with subscriber 1386 a signal pulse is fed over line $ET_A$ to the register allotter RGZ*u*. There, an ET pulse and an *sb* pulse are passed as soon as the information input JEG is free The *sb* pulse seizes a free register, or example register RG2, and feeds the address of the subscriber who has pressed the earth key to the stores for RT and GT in the information input JEG. In addition, a code indicating that an inquiry call is to be made is stored through line ET' in the information input JEG. The information held in the information input JEG is thus as follows:

RT RK GT
1386 002 1386 ET

Let it be assumed that inquiry traffic ranks as a VA 10 grade of service. The information input now obtains access to the information store JSP through line L*tg*2. During the first test cycle, a test is again made to ascertain that the register code of the register RG2 is not stored in any row. In the next cycle, a test is made to ascertain that the subscriber making the inquiry call already has a public exchange transmission circuit. The indication of this is the fact of his grade being stored in a storage row as grade of service VA 01 (local calls), VA 02 (inland trunks) or VA 03 (international trunks). With a public exchange connection in existence (assumed in the example to be in row 14) the subscriber is entitled to make an inquiry call. Thereupon, after it has been checked that no inquiry call has been set up as yet, he is allotted a free storage row (for example row 30), in which the following information is stored:

RT RK GT VA *Pr*
1386 002 0000 10 1

Dialling tone is now sent to subscriber 1386 who can now dial an internal call as already described for internal traffic. In this way, he reaches subscriber 2640.

The speech condition having been reached, row 30 holds the following information:

RT RK GT VA *Pr*
1386 000 2640 10 7

At the same time, on seizing line 30, the digit 1 is placed in front of the grade-of-service digit in row 14, to indicate the inquiry condition, thus:

RT RK GT VA *Pr*
1386 000 0543 12 7

Thereby the connection of the speech path from subscriber 1386 to public exchange transmission circuit 0543 is interrupted, preventing the public exchange subscriber from overhearing. The call charging equipment continues to run unaffected by this.

By operating the earth key again, subscriber 1386 can terminate the inquiry call and can once more restore his connection to the public exchange subscriber through row 14. The following information then stands in row 30:

RT RK GT VA *Pr*
0000 000 2640 00 8

In row 14 upon the partial release of row 30, the kind of traffic is corrected thus:

RT RK GT VA *Pr*
1386 000 0543 02 7

If, however, the subscriber making the inquiry call wished to transfer the call to the public exchange subscriber on to the subscriber to whom he made the inquiry call, he has to replace his receiver instead of operating the earth key for the second time. As the grade-of-service column contains a code indicative of an inquiry call (first digit 1), disconnection (as described in the case of internal traffic) is prevented. Instead, the addresses of the called subscriber GT and of the calling subscriber RT are taken over from row 30 (the inquiry-call row in the example) by the further store of the central control and store ZSS, after which row 30 is released:

RT RK GT VA *Pr*
0000 000 0000 00 0

During the next testing cycle, the address of the called subscriber GT is tested in the manner already described, to determine whether subscriber 2640 of the example is entitled to public exchange calls. If the subscriber 2460 is found to be entitled to public exchange calls, then in the following test cycle the appropriate storage row with public exchange facilities is ascertained by coincidence test while the address of the calling subscriber RT is in the further store. In the example, this is row 14. In this row, the coincident address (1386 in the example) is cleared, the address of the called subscriber GT is stored instead, and the inquiry-call code is cleared in the grade-of-service column. Row 14 thus contains the following information:

RT RK GT VA Pr
2640 000 0543 02 7

The transferring operation is complete.

For incoming public exchange calls, the code combination VA 07, for example, is stored in the grade-of-service column, from which programs are derived for through-dialling and operator control, to enable calls to be set up systematically. For through-dialling, the setting-up of calls is similar to that for internal traffic and in the case of operator control the program followed resembles that applied to inquiry calls.

The foregoing explanation shows that the following steps are essential for each call:

*a.* With the aid of pulses transmitted by the register allotter RGZ*u* to the line *sb* or *sf*, access is provided to the central control as soon as any change is found in the condition of a subscriber's line or exchange line by the tester ZA on testing.

*b.* When connection is established with the central control for setting up a call, a register capable of accommodating a single dialled digit is interposed.

*c.* The central control is advanced step by step by testing for coincidence of the address of the register of the calling subscriber or that of the called subscriber, which for the time being is in the information input JEG, with the addresses read successively from individual rows during cycles of operation.

*d.* The free and engaged test of any called subscriber is likewise carried out by testing all the rows of the information store JSP for coincidence, and, before the program timer is stepped-on any further, the correct preparation of the next program step is tested by coincidence.

*e.* The time-division multiplex connection of the modulators and demodulators for the transmission of audible tones or for establishing the speech path is effected by setting up the appropriate program steps in the rows concerned.

All the program steps can be effected by four program elements, which are varied to meet the requirements of each case, in the following manner:

*aa.* The start program, when the presence of information is found in the store location RK-A of the information input JEG.

*bb.* The search program to test for coincidence between a store location of the information input JEG, for example the store location RT-A, and the content of the corresponding store location RT-$A_S$ of the row of the information store JSP which has just been tested through the static store SS.

*cc.* The setting-up program, that is to say the preparation of the next program step $PP_X$, when coincidence has been found, and the setting up of the new program step in the program control after a repetition of the testing for correct preparation by coincidence.

*dd.* The clearing program, that is to say the stopping of the program timer PSG and the clearance of the information input JEG as soon as the program steps of the microprogram required for the purpose at hand have been completed.

Variations in the four program elements within the available seven zero timings of a microprogram provide an adequate multiplicity of possible combinations for coping with all grades of service and also for blocking inadmissible grade-of-service combinations. The design of the individual program elements is simple and renders the program as a whole easy to supervise.

We claim:

1. In a circuit arrangement for a time-multiplex automatic telephone exchange, the combination comprising means for successively sensing conditions of subscriber's circuits, a main store for storing information obtained as a result of such sensing, means for comparing a result of sensing obtained during a specific sensing operation with information stored as a result obtained during a preceding sensing operation, a plurality of registers, means for seizing a free register when the result of sensing during said specific sensing operation differs from the stored result of any preceding sensing operation, an intermediate store, means for feeding impulses received by said seized register to said intermediate store for temporarily storing corresponding information therein, means for transferring said information from said intermediate store to said main store, the information stored in said main store forming at least one information line therein, the maximum member of possible information lines equaling the maximum number of simultaneous calls, each information line having locations at least for a calling subscriber's address, a called subscriber's address, a number indicative of said seized register and a code number indicative, at any time, of the progress in the setting up of a call between said calling and called subscribers, and means for controlling the setting up of said call and sending of signals to said calling and called subscribers in dependence on the information stored in the information line corresponding to said call.

2. A circuit arrangement as defined in claim 1, wherein said locations are arranged to form columns, one for calling subscribers' addresses, another for called subscribers' addresses, still another for numbers indicative of seized registers, and yet another for code numbers indicative of the progress in the setting up of calls.

3. A circuit arrangement as defined in claim 1, wherein each of said information lines has an additional location for a number indicating the grade of service of a calling subscriber.

4. A circuit arrangement as defined in claim 1, and further comprising a static register and automatic transfer means, said main store including a core matrix forming said rows, said automatic transfer means being arranged for automatically transferring the content of said rows periodically and successively into said static register and subsequently returning said content to said information store.

5. A circuit arrangement as defined in claim 1, wherein said control means comprise switching means, and a counter for counting cycles of operation in the setting up of a call and being arranged to initiate the operation of said switching means for setting up the call in dependence on the count of said counter.

6. A circuit arrangement as defined in claim 1, wherein corresponding locations of different rows are arranged in columns, inscribing of a code number preventing its row from being allocated to a different call, there being provided a source for sending a dialling tone, and means for connecting said source to a calling subscriber's line, after said code number has been inscribed.

7. A circuit arrangement as defined in claim 6, and further comprising central program control means for controlling and sensing the correct acceptance of dialling information, said controlling means including means for emitting command impulses derived from information stored in said main store to cause speech and signal tones to be switched through.

8. A circuit arrangement as defined in claim 1, and further comprising means for cancelling said number indicative of a register when the respective row contains sufficient information for setting up a call.

9. A circuit arrangement as defined in claim 1, wherein said comparing means are arranged for comparing a result of sensing while stored in said intermediate store with information stored in said main store.

10. A circuit arrangement as defined in claim 1, wherein said comparing means include a plurality of AND-gates.

11. A circuit arrangement as defined in claim 1, and further comprising a register allotter, a tester, and a rotary store operating in step with said tester for subscribers' lines and storing, for the duration of one test cycle, conditions of said lines during a last test cycle, wherein, in the absence of coincidence of a code associated with said lines in said tester and rotary store, said register allotter, which compares the output of said tester and the output of said rotary store, producing a signal resulting in the seizure of a free row in said main store.

12. A circuit arrangement as defined in claim 11, wherein said register allotter is connected to said intermediate store.

13. A circuit arrangement as defined in claim 12, wherein said intermediate store contains store locations to accommodate a number corresponding to an exchange line just tested when a signal is given by said register allotter due to a change of condition.

14. A circuit arrangement as defined in claim 12, wherein said signal given by said register allotter causes said register when free to accept dialled information.

15. A circuit arrangement as defined in claim 14, wherein said intermediate store, after connection of said register to a calling subscriber's line, causes dialling tone to be sent to the subscriber's line just tested.